United States Patent
Kleve et al.

(10) Patent No.: US 9,251,788 B2
(45) Date of Patent: Feb. 2, 2016

(54) METHOD AND APPARATUS FOR VOICE-BASED MACHINE TO MACHINE COMMUNICATION

(75) Inventors: Robert Bruce Kleve, Farmington, MI (US); Joseph Carl Beiser, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 472 days.

(21) Appl. No.: 13/587,079

(22) Filed: Aug. 16, 2012

(65) Prior Publication Data
US 2014/0051380 A1 Feb. 20, 2014

(51) Int. Cl.
*H04M 11/04* (2006.01)
*G10L 15/22* (2006.01)
*H04L 29/08* (2006.01)

(52) U.S. Cl.
CPC .............. *G10L 15/22* (2013.01); *H04M 11/04* (2013.01); *H04L 67/125* (2013.01)

(58) Field of Classification Search
CPC ... G10L 15/00; G10L 15/26; H04M 2201/40; H04M 11/04; H04M 2242/04; G06F 17/20; G08B 25/16; H04W 76/007; H04W 4/22
USPC ........... 455/563, 557, 556.1, 564, 412.1, 566, 455/404.1; 379/88.03, 88.02, 88.01; 704/275, 270, 231, 239; 700/279; 345/173; 381/110
See application file for complete search history.

(56) References Cited

U.S. PATENT DOCUMENTS

| | | | |
|---|---|---|---|
| 7,184,957 B2 * | 2/2007 | Brookes | G10L 15/08 704/246 |
| 2002/0126035 A1 | 9/2002 | Hou | |
| 2003/0001820 A1 | 1/2003 | Hou | |
| 2003/0063717 A1 * | 4/2003 | Holmes | 379/88.04 |
| 2003/0093281 A1 * | 5/2003 | Geilhufe et al. | 704/275 |
| 2004/0143440 A1 * | 7/2004 | Prasad | G10L 15/22 704/270 |
| 2004/0193426 A1 * | 9/2004 | Maddux | G06Q 30/02 704/275 |
| 2005/0080632 A1 * | 4/2005 | Endo | G10L 15/08 704/277 |
| 2005/0165609 A1 * | 7/2005 | Zuberec | G10L 15/22 704/270 |
| 2007/0005368 A1 * | 1/2007 | Chutorash | B60R 16/0373 704/275 |
| 2007/0127635 A1 * | 6/2007 | Zellner et al. | 379/67.1 |
| 2009/0112605 A1 * | 4/2009 | Gupta | 704/275 |
| 2009/0286514 A1 * | 11/2009 | Lichorowic et al. | 455/412.2 |
| 2010/0057485 A1 * | 3/2010 | Luft | 705/1 |
| 2010/0094500 A1 * | 4/2010 | Jin | 701/29 |
| 2010/0109946 A1 * | 5/2010 | Pande | 342/357.09 |
| 2010/0112986 A1 * | 5/2010 | Ellingham et al. | 455/414.1 |
| 2011/0202343 A1 * | 8/2011 | Brown et al. | 704/256.1 |

\* cited by examiner

*Primary Examiner* — Mahendra Patel
(74) *Attorney, Agent, or Firm* — Jennifer M. Stec; Brooks Kushman P.C.

(57) ABSTRACT

A system includes a processor configured to communicate, via a voice call, with a remote server over a connection established through a wireless phone in communication with the processor. The processor is also configured to deliver and receive data and instructions over a voice channel, using spoken, human-language-based communication. The processor is further configured to utilize a standardized voice, to dynamically form, transmit and interpret commands and data, including both predefined system commands and dynamically user-input variables relating to one or more system commands.

18 Claims, 3 Drawing Sheets

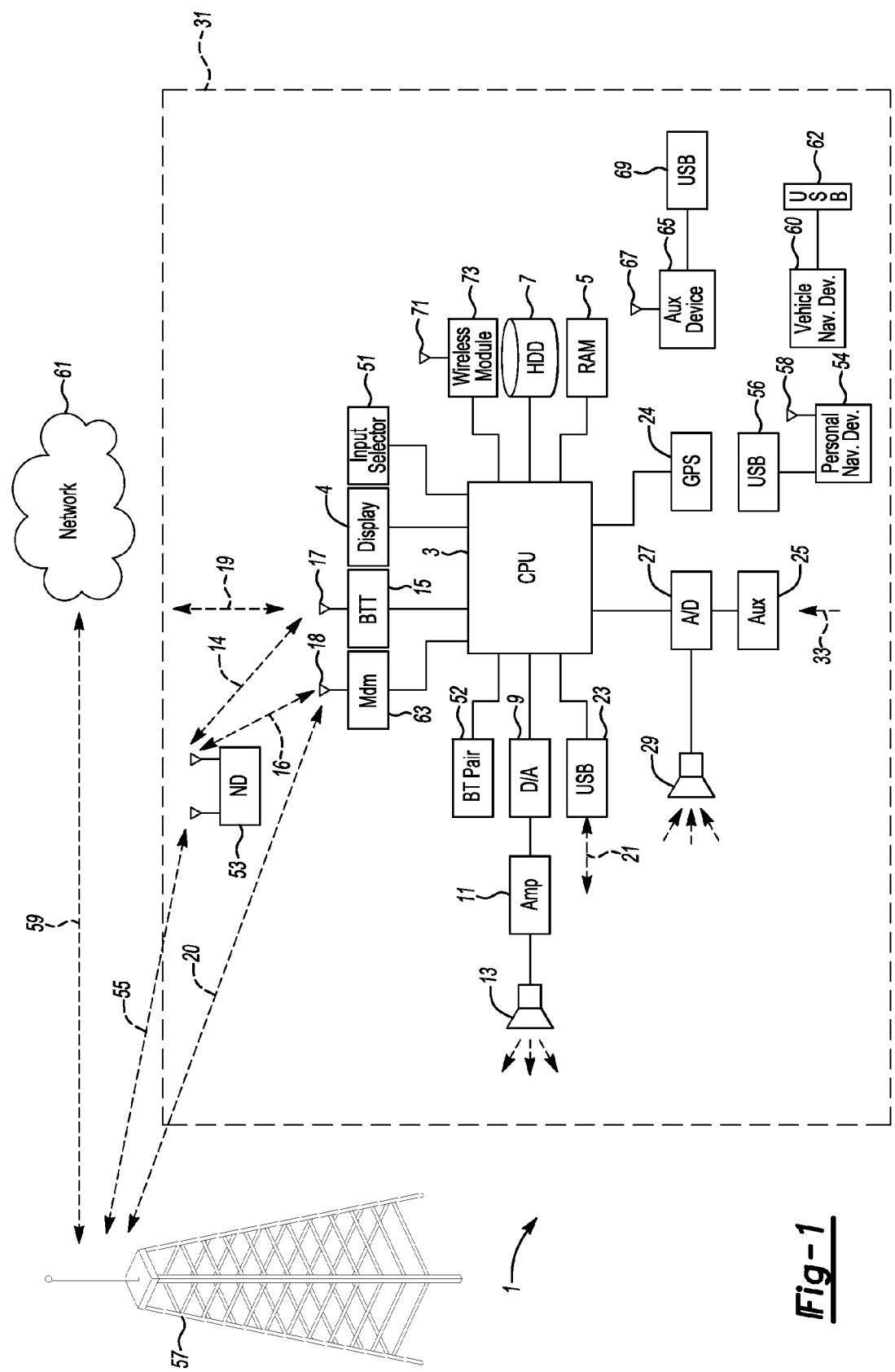

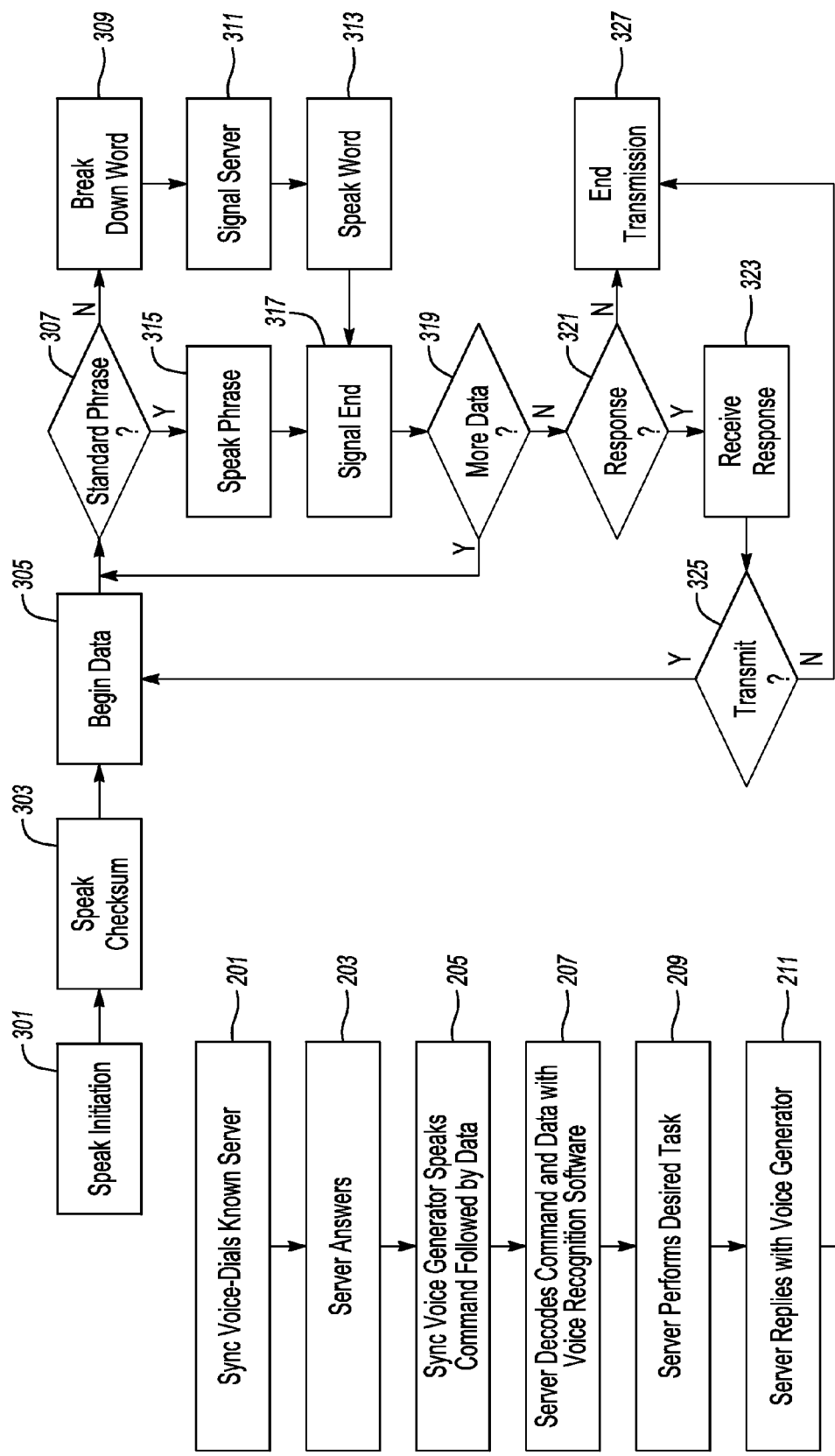

METHOD AND APPARATUS FOR VOICE-BASED MACHINE TO MACHINE COMMUNICATION

TECHNICAL FIELD

The illustrative embodiments generally relate to methods and apparatuses for voice-based machine to machine communication.

BACKGROUND

In-vehicle infotainment services have expanded greatly over the last decade, and now it is often possible to connect a vehicle computer to a remote server while the vehicle is in motion. Through these types of connections, data, vehicle information and remote system calls can be sent and received, providing for a mobile, wirelessly connected environment.

Although the vehicular systems are capable of remote communication, they will typically need some form of signal transport to communicate with a remote source. That is, they typically do not have embedded communication capabilities, but rather rely on, for example, a user wireless device to transport signals to and from the remote source(s).

In one example, the user's cellular phone can be used. Through either a user data plan or data-over-voice, data is sent from the vehicle system, to the user's phone, to the remote source, and back over the same path.

Data over voice solutions, however, may be proprietary in nature and expensive. Certain measures must be taken to maintain data integrity and ensure compatibility, and the nature of the data transfer may result in a relatively low data rate. Data connections, utilizing a user data plan, tend to be faster, but they are limited to instances where a user phone actually has a data plan, and may further require a native application on the device to manage the data session.

SUMMARY

In a first illustrative embodiment, a system includes a processor configured to communicate, via a voice call, with a remote server over a connection established through a wireless phone in communication with the processor. The processor is also configured to deliver and receive data and instructions over a voice channel, using spoken, human-language-based communication. The processor is further configured to utilize a standardized voice, to dynamically form, transmit and interpret commands and data, including both predefined system commands and dynamically user-input variables relating to one or more system commands.

In a second illustrative embodiment, a computer-implemented method includes communicating, via a voice call, with a remote server over a connection established through a wireless phone in communication with a vehicle processor. The method also includes delivering and receiving data and instructions over a voice channel, using spoken, human-language-based communication. Further, the method includes utilizing a standardized voice, to dynamically form, transmit and interpret commands and data, including both predefined system commands and dynamically user-input variables relating to one or more system commands.

In a third illustrative embodiment, a tangible, computer-readable storage medium stores instructions that, when executed by a processor of a vehicle computing system, cause the processor to perform the method including communicating, via a voice call, with a remote server over a connection established through a wireless phone in communication with a vehicle processor. The method also includes delivering and receiving data and instructions over a voice channel, using spoken, human-language-based communication. Further, the method includes utilizing a standardized voice, to dynamically form, transmit and interpret commands and data, including both predefined system commands and dynamically user-input variables relating to one or more system commands.

BRIEF DESCRIPTION OF THE DRAWINGS

FIG. 1 shows an illustrative example of a vehicle computing system;

FIG. 2 shows an illustrative example of a voice-data communication session;

FIG. 3 shows another illustrative example of a voice-data communication session;

DETAILED DESCRIPTION

Figure 4:
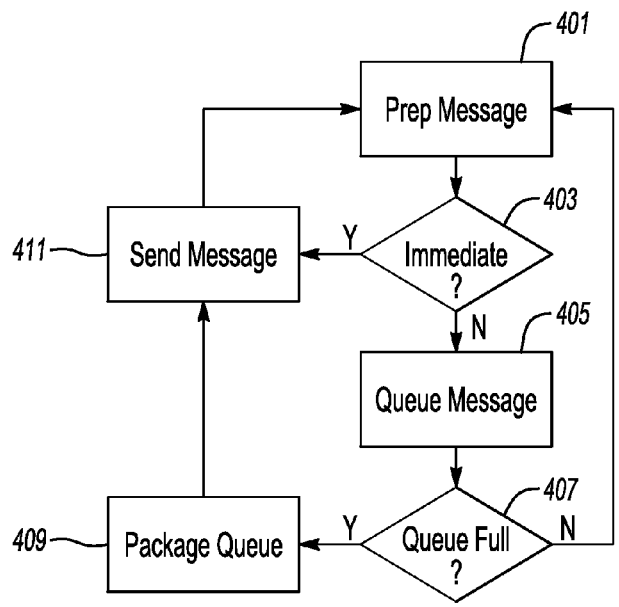
FIG. 4 shows a message queuing session example.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Currently, certain telematics solutions utilize various methods of communication with a remote server to obtain information and services. These communications are typically between a vehicle computing system (VCS), such as, but not limited to, the exemplary system described above, and one or more remote data providers. Communications can be established through a wireless device in the vehicle, either wired or wirelessly connected to the VCS. These communications often come in either the form of data over voice, which utilizes a wireless device's voice channel to transmit data, or in the form of data-plan utilization, which uses a wireless device's data plan.

Each of these existing scenarios, however, has some potential shortcomings. Data over voice may require the use of a third-party provider, which may include both fixed cost and usage rates. Over time, these usage rates can accrue to amount to significant cost to either a vehicle owner or an OEM service provider. Also, the data rates associated with DOV connections can be low compared to other solutions, so extended usage of a phone may be necessary, or, in the alternative, low data-usage solutions to data transfer and services may need to be developed.

The data plans associated with wireless devices, on the other hand, have a much higher data rate than DOV options. This form of data transfer, however, requires that a user phone has a data plan associated therewith. This can present a problem for a user without an active or available data plan. Also, in some implementations, the process may need a native application running on the phone in order to manage the data session.

A third option for data transfer is proposed. While not necessarily superior to the above solutions, this option provides an alternative that may provide useful compatibility and reasonable data transfer and service uses across a variety of wireless devices usable for connection. In the proposed option, a vehicle computing system will utilize a pre-defined voice to speak with a remote server over a phone audio connection. Rather than data over voice, actual voice is used to communicate information back and forth between a remote server and a VCS.

By using a predefined voice (as opposed to, for example, a user voice or random digital voice), the system can ensure a high degree of compatibility for accurate data transfer and command recognition. Also, in at least some instances, recognition functions can ensure that the voice speaking over the phone is "authorized" (i.e., the actual pre-programmed voice). While the pre-programmed voice could, of course, be faked, any voice not matching certain features of the pre-programmed voice could at least be eliminated as an improper attempt to gain access to a system.

FIG. 2 shows an illustrative example of a voice-data communication session. In this illustrative example, the vehicle computing system utilizes a voice command option to deliver data and exchange commands and data as described above. In this example, the VCS will use a connected wireless device to establish a phone call to a known server 201. The number could be, for example, a secure number, which is programmed to receive incoming voice command calls.

In this illustrative example, once the call has been placed, the server will answer 203 and prepare to receive an incoming voice command. In this example, the server begins listening for a command, but the server could also first instruct the VCS on how to proceed upon answering. For example, in at least one model, the server could first request some information from the VCS to verify the eligibility of the calling entity or to establish other security protocols.

In the illustrative example shown herein, the VCS will, at an appropriate time, speak one or more commands, along with any data needed to process the commands 205. For example, without limitation, the process could speak "directions" and then provide information needed for directions including, for example, without limitation, a vehicle location (coordinates), vehicle speed, heading, and a desired destination.

The server, upon receiving an appropriate command and completing any desired verification, could then decode the command and/or incoming data utilizing the appropriate software 207. While voice recognition software would likely be used, the process could utilize relatively simple voice recognition software, since the speaker would be common among all instances of requests (i.e., the computer-generated predetermined voice) as opposed to having to decode and interpret random computer voices or user voices. This should allow some degree of integrity with data transfers and some assurance of accuracy.

Once the command and data have been decoded, the server can then process the incoming command 209. In some instances, the command may be a request for data from the server or require some degree of interaction between the server and the VCS. In these instances, the communication can proceed between the server and the VCS utilizing voice, or, in other cases, a combination of the voice or other options.

In the example shown, for instance, at least one piece of data is relayed back to the VCS from the server. In this instance, the server utilizes a similar voice generator to speak back to the VCS, in a manner similar to which data was sent from the VCS to the server 211. The VCS can then receive the incoming data and use similar decoding software to process the reply 213. This process can then continue a number of times until all the necessary data is transferred between the two entities.

FIG. 3 shows another illustrative example of a voice-data communication session. While similar to the example in FIG. 2, this example shows some advanced command handling and security features. In certain instances, such as, for example, but not limited to, directions and information, non-standard information may need to be passed between a VCS and the server. While the commands for "get directions" and basic location coordinates may be simple enough to standardize, actual names of locations and other addresses may not be built into a standard vocabulary. In such an instance, the process may need to spell out a data element for the remote server such that accurate data delivery is ensured.

In this illustrative example, as with the example in FIG. 2, the process first places a phone call. In this case, the process will be utilizing some form of authentication, and, accordingly, in this example, the process first speaks an initiation command 301 to inform the server that an authentication protocol may be incoming. Of course, the server could request this information instead, or, in another embodiment, if authentication was "always on", this command could be skipped as the authentication sequence would naturally then be the first data transferred.

In this example, once communication has been established and the initiation command has been processed, the VCS then speaks a checksum usable for data error checking and/or other suitable authentication command(s) 303, that the server can use for verification purposes. One the incoming feed has been verified (which may entail a return message, in at least one instance), the VCS can then begin transmitting data 305.

In this illustrative embodiment, since there may be standard or non-standard commands transmitted by the VCS, the process will determine (on the VCS side, in this instance), whether a standard or non-standard phrase, command or data element is being sent 307. If the word is a standard word/phrase/element, the process will then speak the standard word 315 and signal the end of the word or phrase 317. In some instances, the process may not bother signaling the end of a word or phrase, if the receiving process knows when the VCS is done speaking.

In the instance where the phrase to be spoken is non-standard, the process may break down the word into individual elements 309 (e.g., without limitation, letters and/or numbers). For example, if the word was "Nicole Ct.", the process could break down the word into n-i-c-o-l-e-<space>c-t and then signal the server that the word or phrase will be incoming 311. The signal may be a simple one merely indicating that a stream may be incoming, or it could include, for example, some indicia indicating how many letters/characters are to be expected (so the server knows when the data is complete). Once the signal has been sent, the process will speak the characters 313 so that the server can process the incoming non-standard phrase.

In this example, the process may have additional data to be sent after the completion of some initial transmission. If this is the case 319, the process may continue and communication of additional information from the VCS to the server can continue. If there is no more data to be sent, the process may determine if a response is expected 321. If no response is expected, the process may end the transmission 327.

If a response is expected, for example, if a dialogue data-transfer session is ongoing, the process will wait to receive a response from the server 323. Then, if further transmission is required, the process may transmit the information 325 needed to continue the dialogue. Otherwise, the process may end if all transmissions are complete.

FIG. 4 shows a message queuing session example. Since data, in this example, will be transferred using a operator's voice plan, interrupting call capability and possibly using call-plan minutes, it may be desirable to queue up non-immediate transmission for delivery in one payload, or, for example, after a certain time has passed, so as not to use plan-minutes.

While certain data, such as, for example, direction requests, may be desirable for immediate transfer, other information, such as vehicle statistical information or routine data may be held for a time when a channel can be established cheaply. In another example, the data may be kept until whole minute packets are accrued, such that minute usage is optimized, or at least some approximation thereof (e.g., without limitation 50-second packets to allow for delays).

In this illustrative example, the process will prep a message for transfer to the server 401. This preparation can include, but is not limited to, gathering of data, determining non-standard words, determining transmission length and any other suitable preparation. Since immediate transfer may be desirable for certain messages 403, the process can use a connected phone to transfer those messages to the remote server immediately 411. In other instances, however, such as, but not limited to, those described above, the process may queue the messages 405. Once a message has been queued, the process may determine if a queue is full 407 (or, in other instances, if transmission is appropriate for other reasons).

If transmission is desirable due to suitability or, for example, a full message queue, the process may package the queue messages for transmission 409 and proceed with transmission 411. If transmission is terminated for some reason, the queue can be maintained for transmission at a later date. Certain messages may only have usefulness in situations where a same-trip is ongoing, and if a trip completes without transfer of these messages (due to, for example, no instances of acceptable transmission conditions), then the process may eliminate these messages from the queue when the trip ends. In other instances, the messages may be saved for later transmission at a suitable time.

Figure 5:
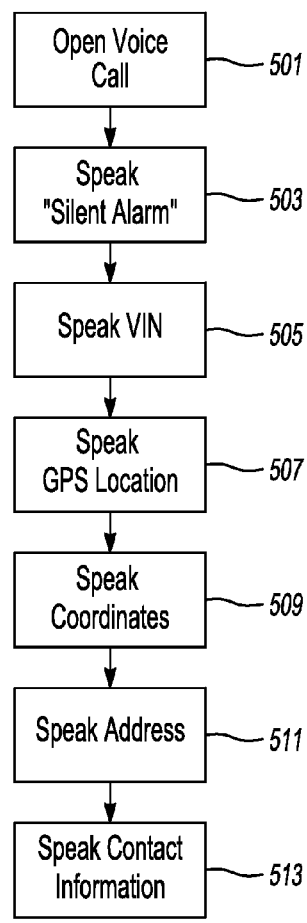
FIG. 5 shows an example of an alarm transmission.

FIG. 5 shows an example of an alarm transmission. This is just one example of the sort of transmission that can be engaged utilizing the illustrative embodiments described herein. In this instance, an alarm may be transferred due to activation of a vehicle security system. In this example, the process opens a voice call 501. Since an attacker may not connect a phone to the system for transmission, an alarm message may be transmitted utilizing a hard-wired phone included in a vehicle.

In this case, the process sends a command such as, for example, "silent alarm" 503. This command can indicate to the remote server that the vehicle has been stolen and notify the server to expect additional information relating to the vehicle. In this instance, the process will speak, for example, a vehicle identification number (VIN) 505. The VIN can be pre-programmed into the process for each vehicle or can be retrieved, for example, from a system bus.

In addition, since this communication relates to a stolen vehicle, the process can include information such as a current GPS location of the vehicle 509. In this example, the words "GPS location" are spoken before the actual coordinates 507, so that the server knows that the GPS coordinates will be incoming. Information, such as GPS information, that may be useful on an ongoing basis, may be repeated a number of times while the alarm call is in progress, so that accurate tracking of the vehicle can occur.

Also, in this embodiment, the process may send information relating to an emergency contact to the server. This can aid the authorities in tracking down a vehicle owner, and will alert the vehicle owner and/or an emergency contact. In this example, the process speaks an address of a vehicle owner or emergency contact 511. Additionally, the process will speak any further contact information 513 that might be useful.

Although not shown, the remote server can then contact a vehicle owner and/or in case of emergency contact with any relevant information. This contact can alert a vehicle owner or emergency contact, allowing for avoidance of false positives and/or allowing the owner or contact to follow through on vehicles that have actually been stolen.

Figure 6:
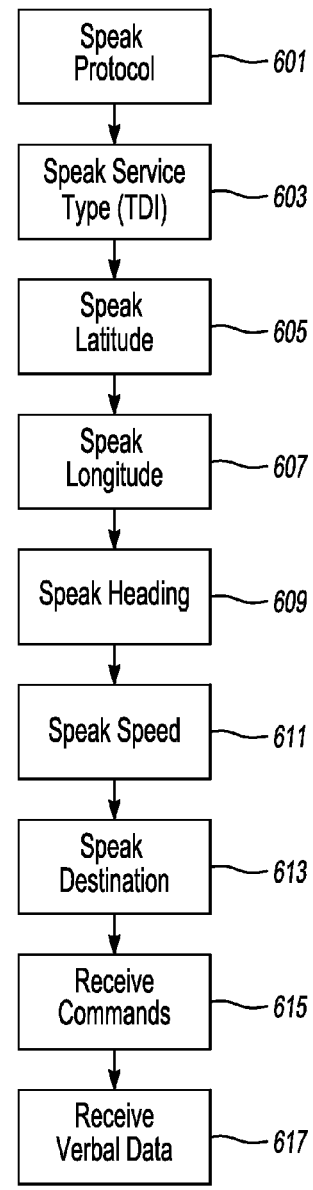
FIG. 6 shows an illustrative example of a traffic directions information (TDI) session.

FIG. 6 shows an illustrative example of a traffic directions information (TDI) session. This is another illustrative example of a process that could be performed utilizing the illustrative embodiments detailed herein. In this illustrative embodiment, the process, after establishing communication with the remote server, may speak a protocol version 601. If there are different versions of directional requests and information, the process use of protocol can alert the server as to which version will be used. Once the protocol is established, in this example, the process speaks a service type, which, in this instance, is a command that corresponds to directions 603.

After establishing that a navigation session is ongoing, the process speaks a vehicle latitude 605 and vehicle longitude 607, to aid the navigation planner in assisting the vehicle. This information, in conjunction with a spoken vehicle heading 609 and vehicle speed 611, allows the remote server to know where the vehicle is currently located. Further, this information can be useful in estimating where a vehicle will be located at the time directions are transferred back to the vehicle.

A destination is then spoken to the remote server 613, which can use the destination to establish a route for transmission to the driver. The process then waits for incoming instructions from the remote server 615 and any data relating to these incoming instructions 617.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle controller, a processor, and memory configured to:
communicate, via a voice call, between a vehicle computer and a remote server over a secure-authenticated connection established through a wireless phone;
deliver and receive navigation data and instructions over a voice channel, using spoken, human-language-based communication generated by the vehicle computer; and
utilize a standardized voice, to dynamically interpret, generate, and transmit instructions and data to the server, including both predefined system commands and non-standardized user-input variables broken into individual characters for audio output.

2. The system of claim 1, wherein at least one user-input variable includes an address.

3. The system of claim 2, wherein the processor is further configured to break a user input address into individual characters and speak the characters individually so as to form the user input address.

4. The system of claim 1, wherein at least one command relates to an alarm notification.

5. The system of claim 1, wherein the processor is further configured to transmit security authentication information of a vehicle security system between the vehicle computer and remote server.

6. The system of claim 1, wherein the processor is further configured to queue a plurality of commands for transmission, along with accompanying data, and to transmit the commands when one or more conditions for queue transmission are met.

7. The system of claim 6, wherein the one or more conditions include a full queue.

8. The system of claim 6, wherein the one or more conditions include an unlimited usage plan of a phone owner and a time of day.

9. The system of claim 6, wherein the one or more conditions include a predefined tolerance of a whole number of one or more minutes and an estimated queue transmission time.

10. A computer-implemented method comprising:
communicating, via a voice call, between a vehicle computer and a remote server over a secure-authenticated connection established through a wireless phone;
delivering and receiving navigation data and instructions over a voice channel, using spoken, language-based communication generated by the vehicle computer; and
utilizing a standardized voice, to dynamically generate and transmit instructions and data to the server, including both predefined system commands and non-standardized user-input variables broken into individual characters for audio output.

11. The method of claim 10, wherein at least one user-input variable includes an address.

12. The method of claim 11, further comprising breaking a user input address into individual characters and speaking the characters individually so as to form the user input address.

13. The method of claim 10, wherein at least one command relates to an alarm notification.

14. The method of claim 10, further including transmitting security authentication information.

15. The method of claim 10, further including queuing a plurality of commands for transmission, along with accompanying data, and transmitting the commands when one or more conditions for queue transmission are met.

16. The method of claim 15, wherein the one or more conditions include a full queue.

17. The method of claim 15, wherein the one or more conditions include an unlimited usage plan of a phone owner and a time of day.

18. A non-transitory, computer-readable storage medium, storing instructions that, when executed by a processor of a vehicle computer, cause the processor to perform the method comprising:
communicating, via a voice call, between the vehicle computer and a remote server over a secure-authenticated connection established through a wireless phone;
delivering and receiving navigation data and instructions over a voice channel, using spoken, language-based communication generated by the vehicle computer; and
utilizing a standardized voice, to dynamically interpret, generate, and transmit instructions and data, including both predefined system commands and non-standardized user-input variables broken into individual characters for audio output.

* * * * *